US010450531B2

(12) United States Patent
Kaneko

(10) Patent No.: US 10,450,531 B2
(45) Date of Patent: Oct. 22, 2019

(54) LUBRICATING OIL COMPOSITION FOR REFRIGERATOR, AND REFRIGERATOR

(71) Applicant: IDEMITSU KOSAN CO., LTD., Chiyoda-ku (JP)

(72) Inventor: Masato Kaneko, Ichihara (JP)

(73) Assignee: IDEMITSU KOSAN CO., LTD., Chiyoda-ku (JP)

( * ) Notice: Subject to any disclaimer, the term of this patent is extended or adjusted under 35 U.S.C. 154(b) by 0 days.

(21) Appl. No.: 15/524,014

(22) PCT Filed: Oct. 23, 2015

(86) PCT No.: PCT/JP2015/080026
§ 371 (c)(1),
(2) Date: May 3, 2017

(87) PCT Pub. No.: WO2016/072302
PCT Pub. Date: May 12, 2016

(65) Prior Publication Data
US 2017/0335232 A1 Nov. 23, 2017

(30) Foreign Application Priority Data

Nov. 7, 2014 (JP) ................................ 2014-227556

(51) Int. Cl.
*C10L 1/18* (2006.01)
*C10M 169/04* (2006.01)
*C08F 116/14* (2006.01)
*C08G 65/34* (2006.01)
*C10M 171/00* (2006.01)
*C09K 5/04* (2006.01)
*C10M 105/18* (2006.01)
*C10M 105/34* (2006.01)
*C10M 105/36* (2006.01)
*C10M 105/38* (2006.01)
*C10M 107/24* (2006.01)
*C10M 171/02* (2006.01)

(52) U.S. Cl.
CPC ....... *C10M 169/048* (2013.01); *C08F 116/14* (2013.01); *C08G 65/34* (2013.01); *C10M 171/008* (2013.01); *C09K 5/04* (2013.01); *C10M 105/18* (2013.01); *C10M 105/34* (2013.01); *C10M 105/36* (2013.01); *C10M 105/38* (2013.01); *C10M 107/24* (2013.01); *C10M 171/02* (2013.01); *C10M 2207/283* (2013.01); *C10M 2207/2835* (2013.01); *C10M 2209/043* (2013.01); *C10M 2209/104* (2013.01); *C10M 2209/108* (2013.01); *C10M 2209/1045* (2013.01); *C10M 2209/1085* (2013.01); *C10N 2220/021* (2013.01); *C10N 2220/022* (2013.01); *C10N 2220/302* (2013.01); *C10N 2220/303* (2013.01); *C10N 2220/306* (2013.01); *C10N 2230/02* (2013.01); *C10N 2230/06* (2013.01); *C10N 2230/12* (2013.01); *C10N 2240/30* (2013.01)

(58) Field of Classification Search
CPC .............. C10M 170/20; C10M 107/20; C10M 107/22; C10M 107/34; C10M 107/18
USPC ......................................................... 508/475
See application file for complete search history.

(56) References Cited

U.S. PATENT DOCUMENTS

| 4,948,525 | A | 8/1990 | Sasaki et al. |
| 6,656,891 | B1 | 12/2003 | Sakanoue et al. |
| 2003/0032563 | A1 | 2/2003 | Tazaki |
| 2004/0157753 | A1 | 8/2004 | Tazaki et al. |
| 2005/0014661 | A1* | 1/2005 | Sunkara ............... C10M 107/34 508/579 |
| 2009/0186788 | A1* | 7/2009 | Tazaki .................. C09K 5/045 508/304 |

FOREIGN PATENT DOCUMENTS

| CN | 1415004 A | 4/2003 |
| CN | 1500855 A | 6/2004 |
| EP | 1 085 077 A1 | 3/2001 |
| EP | 1 312 663 A1 | 5/2003 |
| JP | 2514090 B2 | 7/1996 |
| JP | 9-100483 A | 4/1997 |
| JP | 2595346 B2 | 4/1997 |
| JP | 2005-54063 | 3/2005 |
| JP | 3983328 B2 | 9/2007 |
| JP | 5265069 B2 | 8/2013 |
| WO | 01/48127 A1 | 7/2001 |

OTHER PUBLICATIONS

International Search Report dated Nov. 24, 2015 in PCT/JP2015/080026 Filed Oct. 23, 2015.
Extended Search Report dated Mar. 19, 2018 in European Patent Application No. 15856770.1, citing documents AA, AO and AP therein, 8 pages.
Office Action dated Oct. 16, 2018 in Japanese Patent Application No. 2014-227556 (with unedited computer generated English translation).
European Office Action dated Mar. 29, 2019 in European Patent Application No. 15856770.1, 3 pages.
Office Action dated Jul. 19, 2019, in Chinese Patent Application No. 201580060050.1 filed Oct. 23, 2015 (citing documents AO-AQ therein).

* cited by examiner

*Primary Examiner* — Prem C Singh
*Assistant Examiner* — Francis C Campanell
(74) *Attorney, Agent, or Firm* — Oblon, McClelland, Maier & Neustadt, L.L.P.

(57) ABSTRACT

The lubricating oil composition for a refrigerator according to the present invention is a lubricating oil composition for a refrigerator containing a base oil containing a low-viscosity base oil component having added thereto a polyoxyalkylene glycol compound having a kinetic viscosity at 100° C. that is higher than the low-viscosity base oil component, and the base oil has a kinetic viscosity at 100° C. of 2.4 to 25 mm²/s and a ratio (Mw/Mn) of a weight average molecular weight (Mw) and a number average molecular weight (Mn) of 1.3 to 13.

11 Claims, No Drawings

US 10,450,531 B2

LUBRICATING OIL COMPOSITION FOR REFRIGERATOR, AND REFRIGERATOR

TECHNICAL FIELD

The present invention relates to a lubricating oil composition for a refrigerator capable of being used in various refrigerators, and a refrigerator.

In general, a refrigerator is constituted by at least a compressor, a condenser, an expansion mechanism (such as an expansion valve), and an evaporator, or further constituted by dryer, and has such a structure that a mixed liquid of a refrigerant and a lubricating oil (i.e., a refrigerator oil) is circulated in the closed system. While a chlorine-containing compound, such as a chlorofluorocarbon, has been widely used as the refrigerant for a refrigerator, a compound containing no chlorine, such as a hydrofluorocarbon (HFC), and a natural refrigerant, such as carbon dioxide, are being used instead from the standpoint of the environmental protection. As the hydrofluorocarbon, the use of a saturated hydrofluorocarbon (which may be hereinafter referred to as a saturated HFC), such as 1,1,1,2-tetrafluoroethane (R134a), difluoromethane (R32), pentafluoroethane (R125), and 1,1,1-trifluoroethane (R143a), and a hydrofluoroolefin (which may be hereinafter referred to as an HFO), which is an unsaturated hydrofluorocarbon, such as 1,3,3,3-tetrafluoropropene (HFO1234ze) and 2,3,3,3-tetrafluoropropene (HFO1234yf), has been considered.

For the refrigerator oil used in a refrigerator, the use of various base oils has been considered, and for example, a polyoxyalkylene glycol compound (PAG) has been used as the base oil. For the base oil formed of PAG, it has been considered that for exhibiting various performances thereof properly, the molecular weight of the base oil itself is controlled, and an additive having a large molecular weight is added to the base oil.

For example, PTL 1 describes the use of PAG having a number average molecular weight of 600 to 2,000 and a molecular weight distribution of 1 to 1.2 as a base oil for enhancing the lubricating performance and the compatibility with a carbon dioxide refrigerant. PTL 2 describes, as a refrigerator oil for a saturated HFC refrigerant, a lubricating oil composition for a refrigerator containing a base oil having a kinetic viscosity at 100° C. of 1 to 100 mm$^2$/s having added thereto PAG having a molecular weight of 4,500 to 14,500 in an amount of 1.5 to 5.0 mass %.

CITATION LIST

Patent Literatures

PTL 1: Japanese Patent No. 5,265,069
PTL 2: Japanese Patent No. 3,983,328

SUMMARY OF INVENTION

Technical Problem

In recent years, the efforts on the energy issues and the global warming issues are becoming important, and the demand for energy saving is being increased for refrigerators. However, the use of a base oil having a narrow molecular weight distribution as in PTL 1 fails to exhibit a sufficient lubricating performance with a compound having a small molecular weight. When a compound having an increased molecular weight is used, on the other hand, the low-temperature viscosity is increased to increase the power loss in low temperature start-up and low temperature operation, resulting in failure of sufficient energy saving.

Only the addition of a small amount of PAG having a molecular weight of 14,500 or less to a base oil in PTL 2 fails to enhance sufficiently the lubricating performance over a low temperature to a high temperature while decreasing the power loss in low temperature start-up and the like.

The present invention has been made in view of the aforementioned problems, and an object thereof is to provide a lubricating oil composition for a refrigerator capable of achieving energy saving while enhancing the lubricating performance, and a refrigerator.

Solution to Problem

As a result of earnest investigations made by the present inventors, it has been found that by using a base oil containing a low-viscosity base oil component having blended therewith a high-viscosity polyoxyalkylene glycol compound, and making the kinetic viscosity at 100° C. and the molecular weight distribution of the base oil within the particular ranges, the low-temperature viscosity can be decreased while retaining a proper high-temperature viscosity, and thereby energy saving can be achieved while retaining good lubricating performance, and thus the present invention shown below has been completed.

[1] A lubricating oil composition for a refrigerator, containing a base oil containing a low-viscosity base oil component having added thereto a polyoxyalkylene glycol compound having a kinetic viscosity at 100° C. that is higher than the low-viscosity base oil component,
the base oil having a kinetic viscosity at 100° C. of 2.4 to 25 mm$^2$/s and a ratio (Mw/Mn) of a weight average molecular weight (Mw) and a number average molecular weight (Mn) of 1.3 to 13.

[2] A refrigerator containing, charged therein, the lubricating oil composition according to the item [1] and a refrigerant.

[3] A method for producing a lubricating oil composition for a refrigerator containing a base oil, including adding, to a low-viscosity base oil component, a polyoxyalkylene glycol compound having a kinetic viscosity at 100° C. that is higher than the low-viscosity base oil component, so as to provide the base oil,
the base oil having a kinetic viscosity at 100° C. of 2.4 to 25 mm$^2$/s and a ratio (Mw/Mn) of a weight average molecular weight (Mw) and a number average molecular weight (Mn) of 1.3 to 13.

Advantageous Effects of Invention

According to the present invention, a lubricating oil composition for a refrigerator can have a decreased low-temperature viscosity while retaining a proper high-temperature viscosity, whereby a good lubricating performance can be obtained over a wide temperature range, and energy saving can be achieved.

DESCRIPTION OF EMBODIMENTS

The present invention will be described with reference to embodiments below.

A lubricating oil composition according to one embodiment of the present invention uses, as a base oil, a low-viscosity base oil component having added thereto a polyoxyalkylene glycol compound (which may be hereinafter referred to as a high-viscosity PAG) having a kinetic viscosity at 100° C. that is higher than the low-viscosity base oil component, and the base oil has a kinetic viscosity at 100° C. of 2.4 to 25 mm$^2$/s and a ratio (Mw/Mn) of a weight average molecular weight (Mw) and a number average molecular weight (Mn) of 1.3 to 13.

In the present embodiment, the kinetic viscosity at 100° C. and the Mw/Mn of the base oil are made within the particular ranges as described above, whereby a good lubricating performance can be obtained over a low temperature to a high temperature, and the low-temperature viscosity can be decreased to suppress the power loss in low-temperature start-up and low-temperature operation.

From the aforementioned standpoint, the kinetic viscosity at 100° C. of the base oil is preferably 2.5 to 24 mm$^2$/s, and more preferably 2.5 to 20 mm$^2$/s. The Mw/Mn of the base oil is preferably 1.4 to 12, more preferably 1.5 to 10, and further preferably 1.6 to 9.2.

The lubricating oil composition for a refrigerator generally contains a base oil having added thereto depending on necessity an additive described later, and the base oil is generally contained in the lubricating oil composition for a refrigerator in an amount of 80 mass % or more, and preferably contained in an amount of 90 mass % or more. The base oil contained in the lubricating oil composition for a refrigerator is generally formed of a low-viscosity base oil component and a high-viscosity PAG.

The base oil preferably has a volume resistivity of 10$^6$ Ω·m or more, more preferably 10$^7$ Ω·m or more, and further preferably 10$^8$ Ω·m or more. When the volume resistivity of the base oil is high as described above, good electric insulating property may be obtained to facilitate the application of the lubricating oil composition for a refrigerator to an electric car air-conditioner and the like. The upper limit of the volume resistivity of the base oil is not particularly limited, and is generally 10$^{15}$ Ω·m or less.

The base oil preferably has an iodine value of 10 or less and a hydroxyl value of 10 mgKOH/g or less, more preferably 5 or less and 5 mgKOH/g or less respectively, and further preferably 1 or less and 2 mgKOH/g or less respectively. The acid value thereof is particularly preferably 1 mgKOH/g or less. The base oil preferably has a saturated moisture content of 5% or less, more preferably 3% or less, and further preferably 1% or less. When the iodine value and the hydroxyl value are small as described above, the thermal stability of the lubricating oil composition for a refrigerator can be easily enhanced. When the saturated moisture amount is small as described above, the moisture absorbability of the lubricating oil composition for a refrigerator can be decreased to retain the electric insulating property and the thermal stability thereof in a good state for a prolonged period of time.

The saturated moisture content is a value obtained in such a manner that a specimen oil and water are mixed at a ratio of 1/1 and shaken for 5 minutes, then the specimen oil layer and the water layer are separated by centrifugal separation, and the specimen oil layer is measured for the water content by the Karl Fischer titration method according to JIS K0113-2005. The iodine value is a value that is measured according to JIS K0070, and the hydroxyl value is a value that is measured according to JIS K0070 according to a neutralization analysis.

[Low-Viscosity Base Oil Component]

The low-viscosity base oil component preferably has a kinetic viscosity at 100° C. of 0.5 to 5 mm$^2$/s. When the kinetic viscosity at 100° C. of the low-viscosity base oil component is 0.5 mm$^2$/s or more, the lubricating oil composition for a refrigerator can easily exhibit the lubricating performance. When the kinetic viscosity at 100° C. is 5 mm$^2$/s or less, the viscosity, particularly the low-temperature viscosity, of the lubricating oil composition for a refrigerator can be prevented from being increased unnecessarily, so as to prevent the power loss from being increased. In these points of view, the kinetic viscosity at 100° C. of the low-viscosity base oil component is more preferably 0.6 to 4.5 mm$^2$/s, and further preferably 1 to 4.3 mm$^2$/s. In the same point of view, the number average molecular weight of the low-viscosity base oil component is preferably 100 to 1,500, more preferably 150 to 1,300, and further preferably 300 to 510.

For achieving the volume resistivity, the iodine value, the hydroxyl value, and the saturated moisture content of the base oil within the prescribed ranges as described above, the volume resistivity, the iodine value, the hydroxyl value, and the saturated moisture content of the low-viscosity base oil component are also preferably 10$^6$ Ω·m or more, 10 or less, 10 mgKOH/g or less, and 5% or less, respectively.

The volume resistivity of the low-viscosity base oil component is preferably 5×10$^6$ Ω·m or more in the case of PAG described later. In the case of the other materials than PAG, the volume resistivity is more preferably 10$^8$ Ω·m or more, and further preferably 10$^{10}$ Ω·m or more. The upper limit of the volume resistivity is not particularly limited, and is generally 10$^{15}$ Ω·m or less.

The hydroxyl value of the low-viscosity base oil component is preferably smaller than the high-viscosity PAG described later for preventing the hydroxyl value of the entire base oil from being increased even though the hydroxyl value of the high-viscosity PAG is relatively increased, and is more preferably 5 mgKOH/g or less, and further preferably 2.1 mgKOH/g or less. In the case of PVE, the hydroxyl value thereof is still further preferably 1 mgKOH/g or less.

The iodine value and the saturated moisture content of the low-viscosity base oil component are more preferably 5 or less and 3% or less, respectively.

The content of the low-viscosity base oil component is preferably 93 mass % or less, more preferably 30 to 93 mass %, and further preferably 50 to 90 mass %, based on the total amount of the base oil.

The low-viscosity base oil component is a single material or a mixture of two or more kinds of materials selected from a mineral oil and a synthetic oil, and a synthetic oil is preferably used for achieving good compatibility with the high-viscosity PAG.

Examples of the mineral oil include a paraffinic mineral oil, a naphthenic mineral oil, and an intermediate mineral oil. More specific examples of the mineral oil include a distillate oil obtained through atmospheric distillation of a paraffinic crude oil, a naphthenic crude oil, or an intermediate crude oil, or through distillation under reduced pressure of the residual oil obtained in the atmospheric distillation, and a refined oil obtained through purification of the distillate oil by the ordinary method, such as a solvent refined oil, a hydrogenation refined oil, a dewaxed oil, and a white clay treatment oil.

Examples of the synthetic oil include various ether compounds and ester compounds. Examples of the ether compound include a monoether compound and various polyether compounds, and examples of the polyether compound include various polyether compounds, such as a polyvinyl ether compound (PVE), a polyoxyalkylene glycol compound (PAG), and a copolymer of a poly(oxy)alkylene glycol or a monoether thereof and a polyvinyl ether (ethylene copolymer, ECP). Examples of the ester compound include a monoester compound, a dibasic acid ester compound, and a polyol ester compound (POE). Among these, PVE, PAG, and POE are preferred, PVE and PAG are more preferred, and PVE is most preferred from the standpoint of the large volume resistivity thereof and the enhancement of the compatibility with the high-viscosity PAG.

The monoether compound, the various polyether compounds (i.e., PVE, PAG, and ECP), the monoester compound, the dibasic acid ester compound, and the POE used as the low-viscosity base oil component will be described in more detail below.

<Monoether Compound>

Examples of the monoether compound include a symmetrical ether, such as dipentyl ether, dihexyl ether, diheptyl ether, dioctyl ether, dinonyl ether, and didecyl ether. The alkyl group constituting the symmetrical ethers may be straight-chain or branched, and examples thereof having a branched alkyl group include di-2-ethylhexyl ether and di-3,5,5-trimethylhexyl ether. Examples thereof also include an asymmetrical ether, such as 2-ethylhexyl-n-octyl ether and 3,5,5-trimethylhexyl-n-nonyl ether.

<Polyvinyl Ether Compound (PVE)>

The polyvinyl ether compound (PVE) is a polymer having a vinyl ether-derived constituent unit, and specifically, examples thereof include a polyvinyl compound having a constituent unit represented by the following general formula (A-1).

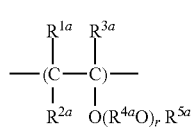

(A-1)

In the general formula (A-1), $R^{1a}$, $R^{2a}$, and $R^{3a}$ each independently represent a hydrogen atom or a hydrocarbon group having 1 to 8 carbon atoms, and they may be the same as or different from each other. Here, specifically, examples of the hydrocarbon group include an alkyl group, such as a methyl group, an ethyl group, an n-propyl group, an isopropyl group, an n-butyl group, an isobutyl group, a sec-butyl group, a tert-butyl group, a pentyl group of every kind, a hexyl group of every kind, a heptyl group of every kind, an octyl group of every kind, etc.; a cycloalkyl group, such as a cyclopentyl group, a cyclohexyl group, a methylcyclohexyl group of every kind, an ethylcyclohexyl group of every kind, a dimethylcyclohexyl group of every kind, etc.; an aryl group, such as a phenyl group, a methylphenyl group of every kind, an ethylphenyl group of every kind, a dimethylphenyl group of every kind, etc.; and an arylalkyl group, such as a benzyl group, a phenylethyl group of every kind, a methylbenzyl group of every kind, etc. Of those, an alkyl group is preferred. In addition, $R^{1a}$, $R^{2a}$, and $R^{3a}$ are each more preferably a hydrogen atom or an alkyl group having 3 or less carbon atoms. In the general formula (A-1), r represents a repeating number, and an average value thereof is a number ranging from 0 to 10, and preferably from 0 to 5.

$R^{4a}$ represents a divalent hydrocarbon group having 2 to 10 carbon atoms. Here, specifically, examples of the divalent hydrocarbon group having 2 to 10 carbon atoms include a divalent aliphatic hydrocarbon group, such as an ethylene group, a phenylethylene group, a 1,2-propylene group, a 2-phenyl-1,2-propylene group, a 1,3-propylene group, a butylene group of every kind, a pentylene group of every kind, a hexylene group of every kind, a heptylene group of every kind, an octylene group of every kind, a nonylene group of every kind, a decylene group of every kind, etc.; an alicyclic hydrocarbon group having two bonding sites in an alicyclic hydrocarbon such as cyclohexane, methylcyclohexane, ethylcyclohexane, dimethylcyclohexane, propylcyclohexane, etc.; a divalent aromatic hydrocarbon group, such as a phenylene group of every kind, a methylphenylene group of every kind, an ethylphenylene group of every kind, a dimethylphenylene group of every kind, a naphthylene group of every kind, etc.; an alkyl aromatic hydrocarbon group having a monovalent bonding site in each of an alkyl group moiety and an aromatic moiety of an alkyl aromatic hydrocarbon such as toluene, ethylbenzene, etc.; an alkyl aromatic hydrocarbon group having bonding sites in an alkyl group moiety of a polyalkyl aromatic hydrocarbon, such as xylene, diethylbenzene, etc.; and the like. Of those, the aliphatic hydrocarbon group having 2 to 4 carbon atoms is more preferred. Plural $R^{4a}$Os may be the same as or different from each other.

Furthermore, in the general formula (A-1), $R^{5a}$ represents a hydrocarbon group having 1 to 10 carbon atoms. Specifically, this hydrocarbon group represents an alkyl group, such as a methyl group, an ethyl group, an n-propyl group, an isopropyl group, an n-butyl group, an isobutyl group, a sec-butyl group, a tert-butyl group, a pentyl group of every kind, a hexyl group of every kind, a heptyl group of every kind, an octyl group of every kind, a nonyl group of every kind, a decyl group of every kind, etc.; a cycloalkyl group, such as a cyclopentyl group, a cyclohexyl group, a methylcyclohexyl group of every kind, an ethylcyclohexyl group of every kind, a propylcyclohexyl group of every kind, a dimethylcyclohexyl group of every kind, etc.; an aryl group, such as a phenyl group, a methylphenyl group of every kind, an ethylphenyl group of every kind, a dimethylphenyl group of every kind, a propylphenyl group of every kind, a trimethylphenyl group of every kind, a butylphenyl group of every kind, a naphthyl group of every kind, etc.; or an arylalkyl group, such as a benzyl group, a phenylethyl group of every kind, a methylbenzyl group of every kind, a phenylpropyl group of every kind, a phenylbutyl group of every kind, etc. Of those, a hydrocarbon group having 1 to 8 carbon atoms is preferred, and an alkyl group having 1 to 6 carbon atoms is more preferred. The alkyl groups may be any of straight-chain, branched, and cyclic groups.

In the polyvinyl compound having a constituent unit represented by the following general formula (A-1), a compound containing 100% of a constituent unit, in which all $R^{1a}$, $R^{2a}$, and $R^{3a}$ represent hydrogen atoms, $R^{5a}$ represents an alkyl group, r represents 0, and $R^{5a}$ represents an alkyl group having 2 to 10 carbon atoms, is preferred. Examples of the alkyl group include an ethyl group, a n-propyl group, an isopropyl group, a n-butyl group, an isobutyl group, a sec-butyl group, a tert-butyl group, a n-amyl group, an isoamyl group, and a 2-ethylhexyl group.

A polymer or a copolymer containing from 40 to 100 mol % of a constituent unit, in which $R^{5a}$ represents an ethyl group, and from 0 to 60 mol % of a constituent unit, in which $R^{5a}$ represents an alkyl group having 3 to 10 carbon atoms, is preferred. Furthermore, it is more preferred that the proportion of the constituent unit, in which $R^{5a}$ represents an ethyl group, is from 50 to 100 mol %, and the proportion of the constituent unit, in which $R^{5a}$ represents an alkyl group having 3 to 10 carbon atoms, is from 0 to 50 mol %. In this case, examples of the alkyl group having 3 to 10 carbon atoms represented by $R^{5a}$ include a n-propyl group, an isopropyl group, a n-butyl group, an isobutyl group, a sec-butyl group, a tert-butyl group, a n-amyl group, an isoamyl group, and a 2-ethylhexyl group.

Although the polyvinyl ether compound is one having the constituent unit represented by the general formula (A-1), a repeating number thereof may be properly chosen according to a desired kinematic viscosity. The aforementioned polyvinyl ether compound can be produced through polymerization of a corresponding vinyl ethereal monomer. The vinyl ethereal monomer that can be used herein is one represented by the following general formula (A-2).

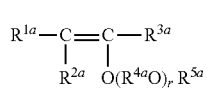
(A-2)

In the formula, $R^{1a}$, $R^{2a}$, $R^{3a}$, $R^{4a}$, $R^{5a}$, and r are the same as those mentioned above.

As this vinyl ethereal monomer, there are various monomers corresponding to the aforementioned polyvinyl ether compounds. Examples thereof include vinyl methyl ether, vinyl ethyl ether, vinyl-n-propyl ether, vinyl isopropyl ether, vinyl-n-butyl ether, vinyl isobutyl ether, vinyl-sec-butyl ether, vinyl-tert-butyl ether, vinyl-n-pentyl ether, vinyl-n-hexyl ether, vinyl-2-methoxyethyl ether, vinyl-2-ethoxyethyl ether, vinyl-2-methoxy-1-methylethyl ether, vinyl-2-methoxypropyl ether, vinyl-3,6-dioxaheptyl ether, vinyl-3,6,9-trioxadecyl ether, vinyl-1,4-dimethyl-3,6-dioxaheptyl ether, vinyl-1,4,7-trimethyl-3,6,9-trioxadecyl ether, vinyl-2,6-dioxa-4-heptyl ether, vinyl-2,6,9-trioxa-4-decyl ether, 1-methoxypropene, 1-ethoxypropene, 1-n-propoxypropene, 1-isopropoxypropene, 1-n-butoxypropene, 1-isobutoxypropene, 1-sec-butoxypropene, 1-tert-butoxypropene, 2-methoxypropene, 2-ethoxypropene, 2-n-propoxypropene, 2-isopropoxypropene, 2-n-butoxypropene, 2-isobutoxypropene, 2-sec-butoxypropene, 2-tert-butoxypropene, 1-methoxy-1-butene, 1-ethoxy-1-butene, 1-n-propoxy-1-butene, 1-isopropoxy-1-butene, 1-n-butoxy-1-butene, 1-isobutoxy-1-butene, 1-sec-butoxy-1-butene, 1-tert-butoxy-1-butene, 2-methoxy-1-butene, 2-ethoxy-1-butene, 2-n-propoxy-1-butene, 2-isopropoxy-1-butene, 2-n-butoxy-1-butene, 2-isobutoxy-1-butene, 2-sec-butoxy-1-butene, 2-tert-butoxy-1-butene, 2-methoxy-2-butene, 2-ethoxy-2-butene, 2-n-propoxy-2-butene, 2-isopropoxy-2-butene, 2-n-butoxy-2-butene, 2-isobutoxy-2-butene, 2-sec-butoxy-2-butene, 2-tert-butoxy-2-butene, and the like. These vinyl ethereal monomers can be produced by a known method.

In an end moiety of the polymer represented by the general formula (A-1), a monovalent group derived from a saturated hydrocarbon, an ether, an alcohol, a ketone, an amide, a nitrile, or the like may be introduced by a known method.

Above all, as the polyvinyl ether compound, those having an end structure of each of the following (1) to (4) are suitable.

(1) A compound in which one end thereof is represented by the following general formula (A-1-i), and the remaining end is represented by the following general formula (A-1-ii).

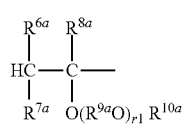
(A-1-i)

In the formula, $R^{6a}$, $R^{7a}$, and $R^{8a}$ each independently represent a hydrogen atom or a hydrocarbon group having 1 to 8 carbon atoms, and they may be the same as or different from each other; $R^{9a}$ represents a divalent hydrocarbon group having 2 to 10 carbon atoms; $R^{10a}$ represents a hydrocarbon group having 1 to 10 carbon atoms; r1 represents a number of 0 to 10 in terms of an average value thereof; and in the case where plural $R^{9a}$Os are present, the plural $R^{9a}$Os may be the same as or different from each other.

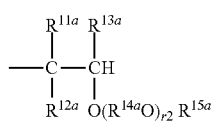
(A-1-ii)

In the formula, $R^{11}a$, $R^{12a}$, and $R^{13a}$ each independently represent a hydrogen atom or a hydrocarbon group having 1 to 8 carbon atoms, and they may be the same as or different from each other; $R^{14a}$ represents a divalent hydrocarbon group having 2 to 10 carbon atoms; $R^{15a}$ represents a hydrocarbon group having 1 to 10 carbon atoms; r2 represents a number of 0 to 10 in terms of an average value thereof; and in the case where plural $R^{14a}$Os are present, the plural $R^{14a}$Os may be the same as or different from each other.

(2) A compound in which one end thereof is represented by the foregoing general formula (A-1-i), and the remaining end is represented by the following general formula (A-1-iii):

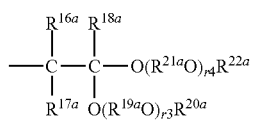
(A-1-iii)

In the formula, $R^{16a}$, $R^{17a}$, and $R^{18a}$ each independently represent a hydrogen atom or a hydrocarbon group having 1 to 8 carbon atoms, and they may be the same as or different from each other; $R^{19a}$ and $R^{21a}$ each independently represent a divalent hydrocarbon group having 2 to 10 carbon atoms, and they may be the same as or different from each other; $R^{20a}$ and $R^{22a}$ each independently represent a hydrocarbon group having 1 to 10 carbon atoms, and they may be the same as or different from each other; r3 and r4 each represent a number of 0 to 10 in terms of an average value thereof, they may be the same as or different from each other; in the case where plural $R^{19a}$Os are present, the plural $R^{19a}$Os may be the same as or different from each other; and in the case where plural $R^{21a}$Os are present, the plural $R^{21a}$Os may be the same as or different from each other.

(3) A compound in which one end thereof is represented by the foregoing general formula (A-1-i), and the remaining end has an olefinic unsaturated bond:

(4) A compound in which one end thereof is represented by the foregoing general formula (A-1-i), and the remaining end is represented by the following general formula (A-1-iv):

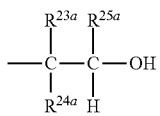
(A-1-iv)

In the formula, $R^{23a}$, $R^{24a}$, and $R^{25a}$ each represent a hydrogen atom or a hydrocarbon group having 1 to 8 carbon atoms, and they may be the same as or different from each other.

The polyvinyl ether compound may also be a mixture of two or more selected from those having an end structure of each of the foregoing (1) to (4). Suitable examples of such a mixture may include a mixture of the compound having the end structure of the foregoing (1) and the compound having the end structure of the foregoing (4); and a mixture of the compound having the end structure of the foregoing (2) and the compound having the end structure of the foregoing (3).

As for the polyvinyl ether compound, it is preferred to choose a degree of polymerization, an end structure, and so on so as to have a preferred viscosity range as mentioned later. The polyvinyl ether compound may be used solely, or it may be used in combination of two or more thereof.

For decreasing the hydroxyl value of the low-viscosity base oil component as described above, among the polyvinyl compounds having the constituent unit represented by the general formula (A-1), in particular, a compound that does not have the general formula (A-1-iv) as the end structure thereof is preferred. A compound in which one end thereof is presented by the general formula (A-1-i), and the remaining end is represented by the general formula (A-1-ii) is preferred.

Above all, it is more preferred that in the formulae (A-1-i) and (A-1-ii), all of $R^{6a}$, $R^{7a}$, $R^{8a}$, $R^{11a}$, $R^{12a}$, and $R^{13a}$ are a hydrogen atom, all of r1 and r2 are 0, and $R^{10a}$ and $R^{15a}$ are each an alkyl group having 1 to 4 carbon atoms.

<Polyoxyalkylene Glycol Compound (PAG)>

Examples of the polyoxyalkylene glycol compound (PAG) include a compound represented by the following general formula (B-1). In the case where PAG is contained in the low-viscosity base oil component, the PAG may be used either solely or in combination of two or more kinds thereof.

$$R^{1b}[\!-\!(OR^{2b})_m\!-\!OR^{3b}]_n \quad \text{(B-1)}$$

In the formula, $R^{1b}$ represents a hydrogen atom, a monovalent hydrocarbon group having 1 to 10 carbon atoms, an acyl group having 2 to 10 carbon atoms, a hydrocarbon group having 2 to 6 bonding sites and having 1 to 10 carbon atoms, or an oxygen-containing hydrocarbon group having 1 to 10 carbon atoms; $R^{2b}$ represents an alkylene group having 2 to 4 carbon atoms; $R^{3b}$ represents a hydrogen atom, a hydrocarbon group having 1 to 10 carbon atoms, an acyl group having 2 to 10 carbon atoms, or an oxygen-containing hydrocarbon group having 1 to 10 carbon atoms; n represents an integer of 1 to 6; and m represents a number of 6 to 80 in terms of an average value of (m×n).

In the general formula (B-1), the monovalent hydrocarbon group having 1 to 10 carbon atoms in each of $R^{1b}$ and $R^{3b}$ may be any of straight-chain, branched, and cyclic groups. The hydrocarbon group is preferably an alkyl group, and specific examples thereof may include a methyl group, an ethyl group, an n-propyl group, an isopropyl group, a butyl group of every kind, a pentyl group of every kind, a hexyl group of every kind, a heptyl group of every kind, an octyl group of every kind, a nonyl group of every kind, a decyl group of every kind, a cyclopentyl group, a cyclohexyl group, and the like. As for the aforementioned monovalent hydrocarbon group, when the number of carbon atoms is 10 or less, the compatibility with the refrigerant becomes good. From such a viewpoint, the number of carbon atoms of the monovalent hydrocarbon group is more preferably 1 to 4.

The hydrocarbon group moiety which the acyl group having 2 to 10 carbon atoms in each of $R^{1b}$ and $R^{3b}$ has may be any of straight-chain, branched, and cyclic groups. The hydrocarbon group moiety of the acyl group is preferably an alkyl group, and specific examples thereof include those having 1 to 9 carbon atoms among the alkyl groups which may be chosen as the aforementioned $R^{1b}$ and $R^{3b}$. When the number of carbon atoms of the acyl group is 10 or less, the compatibility with the refrigerant becomes good. The number of carbon atoms of the acyl group is preferably 2 to 4.

In the case where all of $R^{1b}$ and $R^{3b}$ are a hydrocarbon group or an acyl group, $R^{1b}$ and $R^{3b}$ may be the same as or different from each other.

In the case where $R^{1b}$ is the hydrocarbon group having 2 to 6 bonding sites and having 1 to 10 carbon atoms, this hydrocarbon group may be either linear or cyclic. The hydrocarbon group having 2 bonding sites is preferably an aliphatic hydrocarbon group, and examples thereof include an ethylene group, a propylene group, a butylene group, a pentylene group, a hexylene group, a heptylene group, an octylene group, a nonylene group, a decylene group, a cyclopentylene group, a cyclohexylene group, and the like. Examples of the other hydrocarbon groups may include residues resulting from removing a hydroxyl group from a bisphenol compound such as bisphenol, bisphenol F, bisphenol A, etc. The hydrocarbon group having 3 to 6 bonding sites is preferably an aliphatic hydrocarbon group, and examples thereof may include residues resulting from removing a hydroxyl group from a polyhydric alcohol, such as trimethylolpropane, glycerin, pentaerythritol, sorbitol, 1,2,3-trihydroxycyclohexane, 1,3,5-trihydroxycyclohexane, etc.

When the number of carbon atoms of this aliphatic hydrocarbon group is 10 or less, the compatibility with the refrigerant becomes good. The number of carbon atoms of this aliphatic hydrocarbon group is preferably 2 to 6.

Furthermore, examples of the oxygen-containing hydrocarbon group having 1 to 10 carbon atoms in each of $R^{1b}$ and $R^{3b}$ may include an ether bond-containing linear or cyclic aliphatic group (for example, a tetrahydrofurfuryl group), and the like.

At least one of $R^{1b}$ and $R^{3b}$ is preferably an alkyl group, especially an alkyl group having 1 to 4 carbon atoms.

$R^{2b}$ in the general formula (B-1) is an alkylene group having 2 to 4 carbon atoms, and examples of the oxyalkylene group as a repeating unit include an oxyethylene group, an oxypropylene group, and an oxybutylene group. The oxyalkylene groups in one molecule may be the same as each other, and two or more kinds of oxyalkylene groups may also be contained. It is preferred that at least an oxypropylene unit is contained in one molecule, and it is more preferred that 70 mol % or more of an oxypropylene unit is contained in the oxyalkylene unit, and it is more preferred that 90 mol % or more of an oxypropylene unit is contained therein. When the content of the oxyalkylene unit is large, for example, the saturated moisture content can be decreased to decrease the moisture absorbability.

In the general formula (B-1), n is an integer of 1 to 6 and is determined according to the number of bonding sites of $R^{1b}$. For example, in the case where $R^{1b}$ is an alkyl group or an acyl group, then n is 1; and in the case where $R^{1b}$ is an aliphatic hydrocarbon group having 2, 3, 4, 5, or 6 bonding sites, then n is 2, 3, 4, 5, or 6, respectively.

m is a number providing an average value of (m×n) of 6 to 80. When the average value is 80 or less, the compatibility with a refrigerant may be improved. The average value of (m×n) is preferably determined in such a manner that the viscosity of the low-viscosity base oil component is in the desired range.

n is preferably an integer of 1 to 3, and more preferably 1. In the case where n is 1, it is preferred that any one of $R^{1b}$ and $R^{3b}$ represents an alkyl group, and it is more preferred that both of them each represent an alkyl group. Similarly, in the case where n is 2 or more, it is preferred that any one of plural $R^{3b}$s in one molecule represents an alkyl group, and it is more preferred that all of them each represent an alkyl group. When $R^{1b}$ and $R^{3b}$ represent alkyl group, the hydroxyl value of the low-viscosity base oil component can be decreased.

In the case where n is 2 or more, plural $R^{3b}$s in one molecule may be the same as or different from each other.

<Copolymer of Poly(oxy)alkylene Glycol or Monoether Thereof and Polyvinyl Ether>

In the lubricating oil composition for a refrigerator according to the present embodiment, examples of the copolymer of a poly(oxy)alkylene glycol or a monoether thereof and polyvinyl ether that can be used as the low-viscosity base oil component include a copolymer represented by the following general formula (C-1) and a copolymer represented by the following general formula (C-2) (hereinafter referred to as "polyvinyl ether copolymer I" and "polyvinyl ether copolymer II", respectively). The poly(oxy)alkylene glycol refers to both a polyalkylene glycol and a polyoxyalkylene glycol.

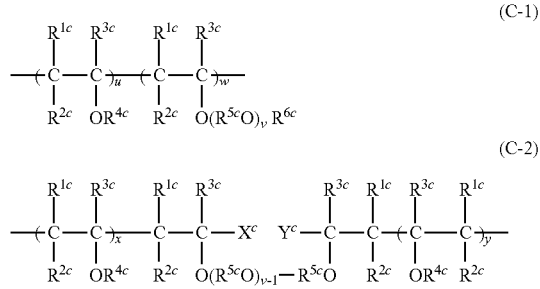

In the general formula (C-1), $R^{1c}$, $R^{2c}$, and $R^{3c}$ each independently represent a hydrogen atom or a hydrocarbon group having 1 to 8 carbon atoms, and they may be the same as or different from each other; $R^{5c}$ represents a divalent hydrocarbon group having 2 to 4 carbon atoms; $R^{6c}$ represents an aliphatic or alicyclic hydrocarbon group having 1 to 20 carbon atoms, an aromatic hydrocarbon group having 1 to 20 carbon atoms which may have a substituent, an acyl group having 2 to 20 carbon atoms, or an oxygen-containing hydrocarbon group having 2 to 50 carbon atoms; $R^{4c}$ represents a hydrocarbon group having 1 to 10 carbon atoms; and in the case where a plurality of each of $R^{1c}$ to $R^{6c}$ are present, they may be each the same as or different from each other.

Here, specifically, the hydrocarbon group having 1 to 8 carbon atoms in $R^{1c}$ to $R^{3c}$ represents an alkyl group, such as a methyl group, an ethyl group, an n-propyl group, an isopropyl group, an n-butyl group, an isobutyl group, a sec-butyl group, a tert-butyl group, a pentyl group of every kind, a hexyl group of every kind, a heptyl group of every kind, an octyl group of every kind, etc.; a cyclopentyl group, a cyclohexyl group, a methylcyclohexyl group of every kind, an ethylcyclohexyl group of every kind, a dimethylcyclohexyl group of every kind, an aryl group such as a dimethylphenyl group of every kind, etc.; or an arylalkyl group, such as a benzyl group, a phenylethyl group, a methylbenzyl group of every kind, etc. In particular, $R^{1c}$, $R^{2c}$, and $R^{3c}$ are each preferably a hydrogen atom.

Meanwhile, specifically, the divalent hydrocarbon group having 2 to 4 carbon atoms as represented by $R^{5c}$ is a divalent alkylene group, such as a methylene group, an ethylene group, a propylene group of every kind, a butylene group of every kind, etc.

In the general formula (C-1), v represents a repeating number of $R^{5c}O$, and is a number ranging from 1 to 50, preferably from 1 to 20, more preferably from 1 to 10, and especially preferably from 1 to 5 in terms of an average value thereof. In the case where plural $R^{5c}$Os are present, the plural $R^{5c}$Os may be the same as or different from each other. v may be the same as or different from each other in every constituent unit.

w represents a number of 1 to 50, preferably 1 to 10, more preferably 1 to 2, and especially preferably 1; u represents a number of 0 to 50, preferably 2 to 25, and more preferably 5 to 15; and in the case where a plurality of each of w and u are present, they may be either block or random.

Furthermore, in the general formula (C-1), $R^{6c}$ preferably represents an alkyl group having 1 to 10 carbon atoms, an acyl group having 2 to 10 carbon atoms, or an oxygen-containing hydrocarbon group having 2 to 50 carbon atoms.

Specifically, this alkyl group having 1 to 10 carbon atoms represents a methyl group, an ethyl group, an n-propyl group, an isopropyl group, an n-butyl group, an isobutyl group, a sec-butyl group, a tert-butyl group, a pentyl group of every kind, a hexyl group of every kind, a heptyl group of every kind, an octyl group of every kind, a nonyl group of every kind, a decyl group of every kind, a cyclopentyl group, a cyclohexyl group, a methylcyclohexyl group of every kind, an ethylcyclohexyl group of every kind, a propylcyclohexyl group of every kind, a dimethylcyclohexyl group of every kind, or the like.

Examples of the acyl group having 2 to 10 carbon atoms include an acetyl group, a propionyl group, a butyryl group, an isobutyryl group, a valeryl group, an isovaleryl group, a pivaloyl group, a benzoyl group, a toluoyl group, and the like.

Furthermore, a methoxymethyl group, a methoxyethyl group, a methoxypropyl group, a 1,1-bismethoxypropyl group, a 1,2-bismethoxypropyl group, an ethoxypropyl group, a (2-methoxyethoxy)propyl group, a (1-methyl-2-methoxy)propyl group, and the like are preferably exemplified as specific examples of the oxygen-containing hydrocarbon group having 2 to 50 carbon atoms.

In the general formula (C-1), specifically, the hydrocarbon group having 1 to 10 carbon atoms as represented by $R^{4c}$ represents an alkyl group, such as a methyl group, an ethyl group, an n-propyl group, an isopropyl group, an n-butyl group, an isobutyl group, a pentyl group of every kind, a hexyl group of every kind, a heptyl group of every kind, an octyl group of every kind, a nonyl group of every kind, a decyl group of every kind, etc.; a cycloalkyl group, such as a cyclopentyl group, a cyclohexyl group, a methylcyclohexyl group of every kind, an ethylcyclohexyl group of every kind, a propylcyclohexyl group of every kind, a dimethylcyclohexyl group of every kind, etc.; an aryl group, such as a phenyl group, a methylphenyl group of every kind, an ethylphenyl group of every kind, a dimethylphenyl group of every kind, a propylphenyl group of every kind, a trimethylphenyl group of every kind, a butylphenyl group of every kind, a naphthyl group of every kind, etc.; an arylalkyl group, such as a benzyl group, a phenylethyl group of every kind, a methylbenzyl group of every kind, a phenylpropyl group of every kind, a phenylbutyl group of every kind, etc.; or the like.

The polyvinyl ether copolymer I having the constituent unit represented by the general formula (C-1) is able to improve lubricating properties, insulating properties, moisture absorbability, and so on while satisfying the compatibility through formation of the copolymer.

Meanwhile, in the polyvinyl ether copolymer II represented by the general formula (C-2), $R^{1c}$ to $R^{5c}$ and v are the same as those mentioned above. In the case where a plurality of each of $R^{4c}$ and $R^{5c}$ are present, they may be each the same as or different from each other. x and y each represent a number of 1 to 50, and in the case where a plurality of each of x and y are present, they may be either block or random. $X^c$ and $Y^c$ each independently represent a hydrogen atom, a hydroxyl group, or a hydrocarbon group having 1 to 20 carbon atoms.

It is preferred that the repeating numbers u, w, x, and y in the general formulae (C-1) and (C-2) are properly chosen such that a desired viscosity as mentioned later is obtained. A production method of each of the polyvinyl ether copolymers I and II is not particularly limited so long as it is a method for which each of the polyvinyl ether copolymers I and II is obtained.

The vinyl ethereal copolymer I represented by the general formula (C-1) can be formed into the polyvinyl ether copolymer I having a structure in which one end thereof is represented by the following general formula (C-3) or (C-4), and the remaining end is represented by the following general formula (C-5) or (C-6).

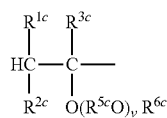
(C-3)

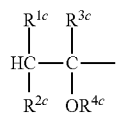
(C-4)

In the aforementioned (C-3) and (C-4), $R^{1c}$ to $R^{6c}$ and v are the same as those as mentioned above.

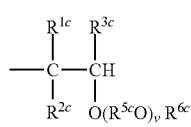
(C-5)

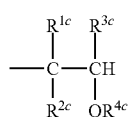
(C-6)

In the aforementioned (C-5) and (C-6), $R^{1c}$ to $R^{6c}$ and v are the same as those as mentioned above.

<Monoester Compound>

Examples of the monoester compound include butyl stearate, octyl stearate, butyl oleate, hexyl oleate, and 2-ethylhexyl oleate.

<Dibasic Acid Ester Compound>

Examples of the dibasic acid ester compound include dibasic acid esters, such as dioctyl adipate, di-2-ethylhexyl adipate, diisodecyl adipate, ditridecyl adipate, di-2-ethylhexyl sebacate, and ditridecyl glutarate.

<Polyol Ester Compound (POE)>

In the lubricating oil composition for a refrigerator, as the polyol ester compound that can be used as the low-viscosity base oil component, an ester of a diol or a polyol having 3 to 20 hydroxyl groups and a fatty acid having about 1 to 24 carbon atoms is preferably used. Here, examples of the diol include ethylene glycol, 1,3-propanediol, propylene glycol, 1,4-butanediol, 1,2-butanediol, 2-methyl-1,3-propanediol, 1,5-pentanediol, neopentyl glycol, 1,6-hexanediol, 2-ethyl-2-methyl-1,3-propanediol, 1,7-heptanediol, 2-methyl-2-propyl-1,3-propanediol, 2,2-diethyl-1,3-propanediol, 1,8-octanediol, 1,9-nonanediol, 1,10-decanediol, 1,11-undecanediol, 1,12-dodecanediol, and the like. Examples of the polyol include a polyhydric alcohol, such as trimethylolethane, trimethylolpropane, trimethylolbutane, di-(trimethylolpropane), tri-(trimethylolpropane), pentaerythritol, di-(pentaerythritol), tri-(pentaerythritol), glycerin, a polyglycerin (e.g., dimer to icosamer of glycerin), 1,3,5-pentanetriol, sorbitol, sorbitan, a sorbitol glycerin condensate, adonitol, arabitol, xylitol, mannitol, etc.; a saccharide, such as xylose, arabinose, ribose, rhamnose, glucose, fructose, galactose, mannose, sorbose, cellobiose, maltose, isomaltose, trehalose, sucrose, raffinose, gentianose, merenditose, etc.; a partially etherified product thereof, a methyl glucoside (a glucoside); and the like. Above all, hindered alcohols, such as neopentyl glycol, trimethylolethane, trimethylolpropane, trimethylolbutane, di-(trimethylolpropane), tri-(trimethylolpropane), pentaerythritol, di-(pentaerythritol), tri-(pentaerythritol), etc., are preferred as the polyol.

As for the fatty acid, though the number of carbon atoms is not particularly limited, those having 1 to 24 carbon atoms are typically used. Among the fatty acids having 1 to 24 carbon atoms, those having 3 or more carbon atoms are preferred, those having 4 or more carbon atoms are more preferred, and those having 5 or more carbon atoms are still more preferred from standpoint of lubricating properties. Those having 18 or less carbon atoms are preferred, those having 12 or less carbon atoms are more preferred, and those having 9 or less carbon atoms are still more preferred from the standpoint of compatibility with the refrigerant.

The fatty acid may be any of a straight-chain fatty acid and a branched fatty acid, a straight-chain fatty acid is preferred from the standpoint of lubricating properties, and a branched fatty acid is preferred from the standpoint of hydrolysis stability. Furthermore, the fatty acid may be any of a saturated fatty acid and an unsaturated fatty acid.

Examples of the fatty acid include a straight-chain or branched fatty acid, such as isobutyric acid, pentanoic acid, hexanoic acid, heptanoic acid, octanoic acid, nonanoic acid, decanoic acid, undecanoic acid, dodecanoic acid, tridecanoic acid, tetradecanoic acid, pentadecanoic acid, hexadecanoic acid, heptadecanoic acid, octadecanoic acid, nonadecanoic acid, icosanoic acid, oleic acid, etc.; a so-called neo acid in which an α-carbon atom is quaternary; and the like. More specifically, isobutyric acid, valeric acid (n-pentanoic acid), caproic acid (n-hexanoic acid), enanthic acid (n-heptanoic acid), caprylic acid (n-octanoic acid), pelargonic acid (n-nonanoic acid), capric acid (n-decanoic acid), oleic acid (cis-9-octadecenoic acid), isopentanoic acid (3-methylbutanoic acid), 2-methylhexanoic acid, 2-ethylpentanoic acid, 2-ethylhexanoic acid, 3,5,5-trimethylhexanoic acid, and the like are preferred.

The polyol ester may be a partial ester in which some of the hydroxyl groups of a polyol remain without being esterified, may be a complete ester in which all of the hydroxyl groups of the polyol are esterified, or may be a mixture of the partial ester and the complete ester, but the polyol ester is preferably the complete ester.

Among the polyol esters, due to the excellent hydrolysis stability, esters of a hindered alcohol, such as neopentyl glycol, trimethylolethane, trimethylolpropane, trimethylolbutane, ditrimethylolpropane, tritrimethylolpropane, pentaerythritol, dipentaerythritol, and tripentaerythritol, are preferred, and esters of neopentyl glycol, trimethylolethane, trimethylolpropane, trimethylolbutane, and pentaerythritol are more preferred.

Specific examples of the preferred polyol ester include a diester of neopentyl glycol and one or more fatty acids selected from isobutyric acid, valeric acid, caproic acid, enanthic acid, caprylic acid, pelargonic acid, capric acid, oleic acid, isopentanoic acid, 2-methylhexanoic acid, 2-ethylpentanoic acid, 2-ethylhexanoic acid, and 3,5,5-trimethylhexanoic acid; a triester of trimethylolethane and one or more fatty acids selected from isobutyric acid, valeric acid, caproic acid, enanthic acid, caprylic acid, pelargonic acid, capric acid, oleic acid, isopentanoic acid, 2-methylhexanoic acid, 2-ethylpentanoic acid, 2-ethylhexanoic acid, and 3,5,5-trimethylhexanoic acid; a triester of trimethylolpropane and one or more fatty acids selected from isobutyric acid, valeric acid, caproic acid, enanthic acid, caprylic acid, pelargonic acid, capric acid, oleic acid, isopentanoic acid, 2-methylhexanoic acid, 2-ethylpentanoic acid, 2-ethylhexanoic acid, and 3,5,5-trimethylhexanoic acid; a triester of trimethylolbutane and one or more fatty acids selected from isobutyric acid, valeric acid, caproic acid, enanthic acid, caprylic acid, pelargonic acid, capric acid, oleic acid, isopentanoic acid, 2-methylhexanoic acid, 2-ethylpentanoic acid, 2-ethylhexanoic acid, and 3,5,5-trimethylhexanoic acid; and a tetraester of pentaerythritol and one or more fatty acids selected from isobutyric acid, valeric acid, caproic acid, enanthic acid, caprylic acid, pelargonic acid, capric acid, oleic acid, isopentanoic acid, 2-methylhexanoic acid, 2-ethylpentanoic acid, 2-ethylhexanoic acid, and 3,5,5-trimethylhexanoic acid.

The ester of two or more fatty acids may be a mixture of two or more esters of one fatty acid and a polyol, and an ester of a mixed fatty acid of two or more kinds thereof and a polyol. Particularly an ester of a mixed fatty acid and a polyol is excellent in low-temperature properties and compatibility with the refrigerant.

[High-Viscosity PAG]

The high-viscosity PAG used in the present embodiment has a kinetic viscosity at 100° C. that is higher than the low-viscosity base oil component, and specifically is preferably the high-viscosity PAG having a kinetic viscosity at 100° C. of 200 to 50,000 mm$^2$/s. When the kinetic viscosity of the high-viscosity PAG is 200 mm$^2$/s or more, the Mw/Mn of the base oil can be easily 1.3 or more. When the kinetic viscosity is 50,000 mm$^2$/s or less, the high-viscosity PAG can be easily produced, and the compatibility of the high-viscosity PAG with the low-viscosity base oil component and the compatibility between the lubricating oil composition for a refrigerator and a refrigerant can be easily improved. Furthermore, the kinetic viscosity at 100° C. and the Mw/Mn of the base oil can be easily within the aforementioned ranges.

In the aforementioned point of view, the kinetic viscosity at 100° C. of the high-viscosity PAG is more preferably 600 to 50,000 mm$^2$/s, and further preferably 1,600 to 50,000 mm$^2$/s. When the kinetic viscosity at 100° C. is 1,600 mm$^2$/s or more, a high effect can be obtained with a relatively small amount of the high-viscosity PAG.

The number average molecular weight of the high-viscosity PAG is preferably 5,000 or more, more preferably 15,000 to 1,000,000, and further preferably 20,000 to 1,000,000, from the same standpoint as the kinetic viscosity.

The Mw/Mn of the high-viscosity PAG is preferably 1 to 5, more preferably 1.05 to 3, further preferably 1.1 to 2, and particularly preferably 1.1 to 1.4, from the standpoint of improving the lubricating performance while decreasing the low-temperature viscosity. The viscosity index (VI) is preferably 280 or more, more preferably 300 or more, and further preferably 380 or more, from the standpoint of improving the lubricating performance while decreasing the low-temperature viscosity.

For achieving the volume resistivity, the iodine value, the hydroxyl value, and the saturated moisture content of the base oil within the prescribed ranges as described above, the volume resistivity, the iodine value, the hydroxyl value, and the saturated moisture content of the high-viscosity PAG are preferably $10^6$ Ω·m or more, 10 or less, 12 mgKOH/g or less, and 5% or less, respectively.

Among these, the volume resistivity of the high-viscosity PAG is more preferably $10^7$ Ω·m or more. The upper limit of the volume resistivity of the high-viscosity PAG is not particularly limited, and is generally $10^9$ Ω·m or less.

The hydroxyl value of the high-viscosity PAG is preferably higher than the low-viscosity base oil component as described above, and is preferably 2 to 12 mgKOH/g, and more preferably 2.2 to 11 mgKOH/g. When a certain amount or more of hydroxyl groups are contained in the high-viscosity PAG, the high-viscosity PAG also exhibit a function as an oiliness agent, and thereby the lubricating performance of the lubricating oil composition can be easily enhanced. Furthermore, the high-viscosity PAG can be easily produced. Even though the hydroxyl value of the high-viscosity PAG is increased, the hydroxyl value of the entire base oil can be prevented from being increased, by making the hydroxyl value of the low-viscosity base oil smaller than the high-viscosity PAG (for example, 2.1 mgKOH/g or less).

Furthermore, the iodine value and the saturated moisture content of the high-viscosity PAG are preferably 5 or less and 3% or less, respectively.

Examples of the high-viscosity PAG include a compound represented by the general formula (B-1) as similar to the low-viscosity base oil component. $R^{1b}$, $R^{2b}$, n, and $R^{3b}$ in the general formula (B-1) are the same as above except for the following differences.

Specifically, while m in the general formula (B-1) for the low-viscosity base oil component is a number providing an average value of (m×n) of 6 to 80, m for the high-viscosity PAG is a number providing an average value of (m×n) of about 85 to 20,000. However, m may be appropriately changed corresponding to the kinetic viscosity and the number average molecular weight of the high-viscosity PAG described above.

In the high-viscosity PAG, at least one of $R^{1b}$ and $R^{3b}$ preferably represents a hydrogen atom. For example, in the case where n is 1, any one of $R^{1b}$ and $R^{3b}$ preferably represents a hydrogen atom, and in the case where n is 2 or more, any one of plural $R^{3b}$s in one molecule preferably represents a hydrogen atom.

In the case where n is 1, while it is more preferred that both of $R^{1b}$ and $R^{3b}$ each represent an alkyl group in the PAG for the low-viscosity base oil component, it is preferred that both of $R^{1b}$ and $R^{3b}$ represent hydrogen atoms in the high-viscosity PAG. Similarly, in the case where n is 2 or more, while it is more preferred that all of plural $R^{3b}$s in one molecule each represent an alkyl group in the PAG for the low-viscosity base oil component, it is preferred that all of plural $R^{3b}$s in one molecule represent hydrogen atoms in the high-viscosity PAG.

When hydroxyl groups are contained at the ends of the high-viscosity PAG, the lubricating performance of the lubricating oil composition can be easily enhanced. Even though the ends of the high-viscosity PAG are hydroxyl groups, the hydroxyl value of the entire base oil can be suppressed to a low value, by decreasing the hydroxyl value of the low-viscosity base oil component.

The PAG constituting the high-viscosity PAG may be used solely, or it may be used in combination of two or more thereof.

The high-viscosity PAG is preferably contained in an amount of 7 mass % or more based on the total amount of the base oil, and the content thereof is preferably 7 to 70 mass %, and more preferably 10 to 50 mass %.

When the content of the high-viscosity PAG is 7 mass % or more, the kinetic viscosity at 100° C. and the Mw/Mn of the base oil can be easily within the aforementioned ranges, and the lubricating performance can be improved over a low temperature to a high temperature while decreasing the low-temperature viscosity.

The content of the high-viscosity PAG may not be necessarily so large in the case where the kinetic viscosity thereof is relatively high. For example, in the case where the kinetic viscosity at 100° C. of the high-viscosity PAG is 1,600 mm²/s or more, the effect of the high-viscosity PAG can be sufficiently exhibited even with the content thereof of about 7 to 25 mass %.

While not particularly limiting, the high-viscosity PAG is preferably produced, for example, by polymerizing an alkylene oxide by using a composite metal catalyst. By using a composite metal catalyst, the high-viscosity PAG can be easily produced.

The composite metal catalyst is preferably a composite metal cyanide complex catalyst. Specific examples of the composite metal cyanide complex catalyst include a compound having a structure represented by the following general formula (A).

$$M_a[M'_x(CN)_y]_b(H_2O)_c(R)_d \qquad (A)$$

In the general formula, M represents Zn(II), Fe(II), Fe(III), Co(II), Ni(II), Al(III), Sr(II), Mn(II), Cr(III), Cu(II), Sn(II), Pb(II), Mo(IV), Mo(VI), W(IV), W(VI), or the like; M' represents Fe(II), Fe(III), Co(II), Co(III), Cr(II), Cr(III), Mn(II), Mn(III), Ni(II), V(IV), V(V), or the like; R represents an organic ligand; a, b, x, and y each are a positive integer that vary depending on the valency and the coordination number of the metal; and c and d each are a positive number that vary depending on the coordination number of the metal.

In the general formula (A), M preferably represents Zn(II), and M' preferably represents Fe(II), Fe(III), Co(II), Co(III), or the like. Examples of the organic ligand include a ketone, an ether, an aldehyde, an ester, an alcohol, and an amide, and an alcohol is preferred.

The composite metal cyanide complex represented by the general formula (A) may be produced in such a manner that aqueous solutions or mixed solvent solutions with water and an organic solvent of a metal salt $MX_a$ (wherein M and a are the same as above; and X represents an anion forming a salt with M) and a polycyanometallate (salt) $Z_e[M'_x(CN)_y]_f$ (wherein M', x, and y are the same as above; Z represents hydrogen, an alakli metal, an alkaline earth metal, or the like; and e and f each represent a positive integer determined by the valency and the coordination number of M') are mixed to provide a composite metal cyanide complex, with which the organic ligand R is made contact, and then the excessive solvent and the excessive organic ligand R are removed.

In the polycyanometallate (salt) $Z_e[M'_x(CN)_y]_f$, hydrogen and various metals, such as an alkali metal, can be used as Z, and a lithium salt, a sodium salt, a potassium salt, a magnesium salt, and a calcium salt are preferred. What are particularly preferred are normal alkali metal salts, i.e., a sodium salt and a potassium salt.

The high-viscosity PAG is generally produced by making a mixture of the alkylene oxide and an initiator in contact with the catalyst, and a particular amount of an organic solvent is preferably present in the reaction. The presence of an organic solvent may increase the molecular weight of the PAG. The reaction may also be performed by adding the alkylene oxide gradually to the reaction system, and an organic solvent may be added along with the alkylene oxide. While the reaction may occur under ordinary temperature, the reaction system may be heated or cooled depending on necessity. The temperature is generally controlled to about 50 to 150° C. The amount of the catalyst used is not particularly limited, and is suitably from 1 to 5,000 ppm based on the initiator used. The catalyst may be introduced to the reaction system at one time at the beginning of the reaction or may be divided and introduced sequentially.

The amount of the organic solvent present in the reaction is preferably 10 to 90 mass % based on the amount of the high-viscosity PAG finally obtained. When the amount of the organic solvent is 10 mass % or more, the molecular weight of the PAG can be further increased. When the amount thereof is 90 mass % or less, the high-viscosity PAG can be produced with good economic efficiency.

The organic solvent used may be various organic solvents, and is preferably an ether compound. Examples of the ether compound include a monoether, a diether, a polyether compound, a polyvinyl ether compound, and a polyalkylene glycol compound.

Examples of the monoether include a dialkyl ether, in which the alkyl group is a branched or straight-chain alkyl group having 1 to 12 carbon atoms, and specific examples thereof include a symmetrical ether, such as di-2-ethylhexyl ether and di-3,5,5-trimethylhexyl ether, and an asymmetrical ether, such as 2-ethylhexyl n-octyl ether and 3,5,5-trimethylhexyl n-nonyl ether.

The diether used may be, for example, a dialkyl ether of various diols. Examples of the diol used include a straight-chain alkanediol, such as an alkylene glycol, e.g., ethylene glycol, propylene glycol, and butylene glycol, 1,3-propanediol, and 1,4-butanediol; and a branched alkenediol, such as neopentyl glycol. Examples of the polyether used include alkyl ethers of a polyhydric alcohol, such as glycerin, tetramethylolethane, tetramethylolpropane, pentaerythritol, and dipentaerythritol.

The alkyl group used in the dialkyl ether and the alkyl ether of a polyhydric alcohol may be a branched or straight-chain alkyl group having 1 to 12 carbon atoms. The alkyl group of the diether and the polyether may be used solely, or it may be used in combination of two or more thereof.

The polyvinyl ether compound and the polyalkylene glycol compound used as the organic solvent may be similar as used as the low-viscosity base oil. However, the polyalkylene glycol compound that has a —OH group at the end thereof may be reacted with a monomer, and therefore the compound having the end that is etherified with an alkyl group having 1 to 4 carbon atoms can be used. Specifically, in the case where n in the formula (B-1) is 1, the compound in which both $R^{1b}$ and $R^{3b}$ each represent an alkyl group having 1 to 4 carbon atoms can be used. Similarly, in the case where n is 2 or more, the compound in which all of plural $R^{3b}$s in one molecule each represent an alkyl group having 1 to 4 carbon atoms can be used. Similarly, as the polyvinyl ether compound, the compound having the end that has no —OH group may be used.

After completing the reaction, the organic solvent may be removed partially or entirely, and may not be removed. In the case where at least a part of the organic solvent is not removed after the reaction, the organic solvent is contained in the lubricating oil composition for a refrigerator along with the high-viscosity PAG, and used as at least a part of the low-viscosity base oil component. Accordingly, in the case where the organic solvent is used as at least a part of the low-viscosity base oil component, the organic solvent used is preferably a polyvinyl ether compound or a polyalkylene glycol compound.

The initiator may be appropriately selected depending on the structure of the high-viscosity PAG, and in the case where the resulting high-viscosity PAG is represented by the general formula (B-1), the initiator is preferably an alcohol compound represented by the general formula, $R^{1b}(OH)_n$ or HO—$R^{2b}$—OH (wherein $R^{1b}$, n, and $R^{2b}$ are the same as above).

The alkylene oxide may be appropriately selected corresponding to $R^{2b}$ in the general formula (B-1), and examples thereof include ethylene oxide, propylene oxide, and a butylene oxide.

The high-viscosity PAG thus obtained after the reaction contains the catalyst and the organic solvent, and thus at least the catalyst is necessarily removed. The processing method therefore is preferably, for example, such a method that a catalyst deactivator, such as an alkali metal compound, is added to deactivate the catalyst, and then the compound is purified.

[Other Additives]

The lubricating oil composition for a refrigerator according to the present embodiment may further contain one kind or two or more kinds of additives, such as an antioxidant, an acid scavenger, an oxygen scavenger, an extreme pressure agent, an oiliness agent, a copper deactivator, a rust preventive, and a anti-foaming agent. The additives are contained preferably in an amount of about 20 mass % or less, and more preferably about 0 to 10 mass %, based on the total amount of the lubricating oil composition for a refrigerator.

Examples of the antioxidant include a phenolic antioxidant, such as 2,6-di-tert-butyl-4-methylphenol, 2,6-di-tert-butyl-4-ethylphenol, 2,2'-methylenebis(4-methyl-6-tert-butylphenol), etc.; and an amine type antioxidant, such as phenyl-α-naphthylamine, N,N'-di-phenyl-p-phenylenediamine, etc., and a phenolic antioxidant is preferred. From the standpoints of effects and economy, and so on, the content of the antioxidant is typically 0.01 to 5 mass %, and preferably 0.05 to 3 mass %, based on the total amount of the lubricating oil composition for a refrigerator.

Examples of the acid scavenger may include an epoxy compound, such as phenyl glycidyl ether, an alkyl glycidyl ether, an alkylene glycol glycidyl ether, cyclohexene oxide, an α-olefin oxide, an epoxidized soybean oil, etc. Above all, from the standpoint of compatibility, phenyl glycidyl ether, an alkyl glycidyl ether, an alkylene glycol glycidyl ether, cyclohexene oxide, and an α-olefin oxide are preferred.

The alkyl group in the alkyl glycidyl ether and the alkylene group in the alkylene glycol glycidyl ether may be each branched, and the number of carbon atoms thereof is typically 3 to 30, preferably 4 to 24, and especially preferably 6 to 16. As for the α-olefin oxide, one having a total number of carbon atoms of generally 4 to 50, preferably 4 to 24, and especially 6 to 16 is used. In the present embodiment, the acid scavenger may be used solely, or may be used in combination of two or more thereof. The content thereof is typically 0.005 to 5 mass %, and preferably 0.05 to 3 mass % relative to the whole amount of the refrigerator oil from the standpoints of effects and inhibition of sludge generation.

In the present embodiment, by containing the acid scavenger, the stability of the lubricating oil composition for a refrigerator can be improved.

Examples of the oxygen scavenger include a sulfur-containing aromatic compound, such as 4,4'-thiobis(3-methyl-6-t-butylphenol), diphenyl sulfide, dioctyldiphenyl sulfide, a dialkyldiphenylene sulfide, benzothiophene, dibenzothiophene, phenothiazine, benzothiapyrane, thiapyrane, thianthrene, dibenzothiapyrane, diphenylene disulfide, etc.; an aliphatic unsaturated compound, such as various olefins, dienes, and trienes, etc.; a terpene compound having a double bond; and the like.

Examples of the extreme pressure agent may include a phosphorus type extreme pressure agent, such as a phosphate ester, an acidic phosphate ester, a phosphite ester, an acidic phosphite ester, and an amine salt thereof, etc.

As such a phosphorus type extreme pressure agent, tricresyl phosphate, trithiophenyl phosphate, tri(nonylphenyl) phosphite, dioleyl hydrogenphosphite, 2-ethylhexydiphenyl phosphite, and the like are exemplified from the standpoint of the extreme pressure property, the frictional characteristics, and the like.

In addition, examples of the extreme pressure agent include a metal salt of a carboxylic acid. The metal salt of a carboxylic acid as referred to herein is preferably a metal salt of a carboxylic acid having 3 to 60 carbon atoms, and more preferably a metal salt of a fatty acid having 3 to 30 carbon atoms, and especially preferably 12 to 30 carbon atoms. In addition, examples thereof may include a metal salt of a dimer acid or a trimer acid of the aforementioned fatty acid, and a dicarboxylic acid having 3 to 30 carbon atoms. Of those, a metal salt of a fatty acid having 12 to 30 carbon atoms and a dicarboxylic acid having 3 to 30 carbon atoms is especially preferred.

Meanwhile, the metal constituting the metal salt is preferably an alkali metal or an alkaline earth metal, and in particular, an alkali metal is optimum.

In addition, examples of the extreme pressure agent other than those as mentioned above may include a sulfur type extreme pressure agent, such as sulfurized fats and oils, a sulfurized fatty acid, a sulfurized ester, a sulfurized olefin, a dihydrocarbyl polysulfide, a thiocarbamate compound, a thioterpene compound, a dialkyl thiodipropionate compound, etc.

The content of the extreme pressure agent is typically 0.001 to 5 mass %, and especially preferably 0.005 to 3 mass % on the basis of the whole amount of the lubricating oil composition for a refrigerator from the standpoints of lubricating properties and stability.

The extreme pressure agent may be used solely, or may be used in combination of two or more thereof.

Examples of the oiliness agent include an aliphatic saturated or unsaturated monocarboxylic acid, such as stearic acid, oleic acid, etc.; a polymerized fatty acid, such as a dimer acid, a hydrogenated dimer acid, etc.; a hydroxy fatty acid, such as ricinoleic acid, 12-hydroxystearic acid, etc.; an aliphatic saturated or unsaturated monoalcohol, such as lauryl alcohol, oleyl alcohol, etc.; an aliphatic saturated or unsaturated monoamine, such as stearylamine, oleylamine, etc.; an aliphatic saturated or unsaturated monocarboxylic acid amide, such as lauric acid amide, oleic acid amide, etc.; a partial ester of a polyhydric alcohol, such as glycerin, sorbitol, etc., and an aliphatic saturated or unsaturated monocarboxylic acid; and the like.

Such an oiliness agent may be used solely, or may be used in combination of two or more thereof. The content thereof is chosen within the range of typically from 0.01 to 10 mass %, and preferably from 0.1 to 5 mass % on the basis of the whole amount of the lubricating oil composition for a refrigerator.

Examples of the copper deactivator may include an N—[N,N'-dialkyl(alkyl group having 3 to 12 carbon atoms) aminomethyl]triazole, and the like.

Examples of the defoaming agent may include a silicone oil, a fluorinated silicone oil, and the like. The content of the defoaming agent is typically 0.005 to 2 mass %, and preferably 0.01 to 1 mass % relative to the whole amount of the lubricating oil composition for a refrigerator.

Examples of the rust preventive may include a metal sulfonate, an aliphatic amine compound, an organic phosphite ester, an organic phosphate ester, an organic sulfonic acid metal salt, an organic phosphoric acid metal salt, an alkenyl succinate ester, a polyhydric alcohol ester, and the like.

The lubricating oil composition for a refrigerator according to the present embodiment may further contain various other known additives within the range where the object of the present invention is not impaired.

[Production Method of Lubricating Oil Composition for Refrigerator]

For the lubricating oil composition for a refrigerator according to the present embodiment, the base oil is obtained by adding at least the high-viscosity PAG to the low-viscosity base oil component. At this time, the method of adding the high-viscosity PAG is not particularly limited, and for example, the low-viscosity base oil component and the high-viscosity PAG may be simultaneously added to a mixing tank, or the high-viscosity PAG may be added to the low-viscosity base oil component having been placed in a mixing tank in advance, and vice versa.

The base oil may have the other additives described above added thereto depending on necessity. At this time, the method of adding the additives is not particularly limited, and for example, the additives may be added to the low-viscosity base oil component, and the high-viscosity PAG may be further added to the low-viscosity base oil component having the additives added thereto, or the additives may be added to the high-viscosity PAG, and the low-viscosity base oil component may be further added to the high-viscosity PAG having the additives added thereto, or the additives may be added to the base oil having been prepared (i.e., a mixture of the low-viscosity base oil component and the high-viscosity PAG).

[Refrigerant]

The lubricating oil composition for a refrigerator according to the present embodiment is one used in the refrigerant environment, and specifically, it is mixed with a refrigerant and used in a refrigerator. In the lubricating oil composition for a refrigerator, as for the amounts of the refrigerant and the lubricating oil composition for a refrigerator, the mass ratio of the refrigerant to the lubricating oil composition for a refrigerator is generally in a range of 99/1 to 10/90, and preferably 95/5 to 30/70. When the mass ratio falls within the aforementioned range, the refrigeration capability and the lubricating properties in the refrigerator can be made appropriate.

Examples of the refrigerant that is used with the lubricating oil composition for a refrigerator include one kind or two or more kinds selected from a fluorinated hydrocarbon refrigerant, such as a saturated fluorinated hydrocarbon compound (HFC) and an unsaturated fluorinated hydrocarbon compound (HFO), and a natural refrigerant, such as carbon dioxide and a hydrocarbon.

In the present embodiment, among these, carbon dioxide and an unsaturated fluorinated hydrocarbon compound are preferred, and an unsaturated fluorinated hydrocarbon compound is more preferred.

<Unsaturated Fluorinated Hydrocarbon Compound>

Examples of the unsaturated fluorinated hydrocarbon compound include those having a carbon-carbon double bond, such as a fluoride of chain olefin having 2 to 6 carbon atoms that is a straight-chain or branched, a fluoride of a cyclic olefin having 4 to 6 carbon atoms, etc.

More specifically, examples thereof include an ethylene having 1 to 3 fluorine atoms introduced thereinto, a propene having 1 to 5 fluorine atoms introduced thereinto, a butene having 1 to 7 fluorine atoms introduced thereinto, a pentene having 1 to 9 fluorine atoms introduced thereinto, a hexene having 1 to 11 fluorine atoms introduced thereinto, a cyclobutene having 1 to 5 fluorine atoms introduced thereinto, a cyclopentene having 1 to 7 fluorine atoms introduced thereinto, a cyclohexene having 1 to 9 fluorine atoms introduced thereinto, and the like.

Of those unsaturated fluorinated hydrocarbon compounds, a fluoride of propene is preferred, a propene having 3 to 5 fluorine atoms introduced thereinto is more preferred, and a propene having 4 fluorine atoms introduced thereinto is most preferred. Specifically, 1,3,3,3-tetrafluoropropene (HFO1234ze) and 2,3,3,3-tetrafluoropropene (HFO1234yf) are exemplified as a preferred compound.

Such an unsaturated fluorinated hydrocarbon compound may be used solely, or may be used in combination of two or more kinds thereof, or may be used in combination of other refrigerant than the unsaturated fluorinated hydrocarbon compound. In particular, a refrigerant containing 1,3,3,3-tetrafluoropropene (HFO1234ze) solely and a refrigerant containing 2,3,3,3-tetrafluoropropene (HFO1234yf) solely are preferred.

<Saturated Fluorinated Hydrocarbon Compound>

The saturated fluorinated hydrocarbon compound is typically a fluoride of an alkane having 1 to 4 carbon atoms, preferably a fluoride of an alkane having 1 to 3 carbon atoms, and more preferably a fluoride of an alkane having 1 to 2 carbon atoms (methane or ethane). Specifically, examples of the fluoride of methane or ethane include trifluoromethane (R23), difluoromethane (R32), 1,1-difluoroethane (R152a), 1,1,1-trifluoroethane (R143a), 1,1,2-trifluoroethane (R143), 1,1,1,2-tetrafluoroethane (R134a), 1,1,2,2-tetrafluoroethane (R134), and 1,1,1,2,2- pentafluoroethane (R125). Of those, difluoromethane and 1,1,1,2,2-pentafluoroethane are preferred.

Such a saturated fluorinated hydrocarbon compound may be used solely, or may be used in combination of two or more kinds thereof. Examples of the case of using two or more kinds of saturated fluorinated hydrocarbon compounds in combination include a mixed refrigerant of two or more kinds of saturated fluorinated hydrocarbon compounds having 1 to 3 carbon atoms; and a mixed refrigerant of two or more kinds of saturated fluorinated hydrocarbon compounds having 1 to 2 carbon atoms. In particular, a refrigerant containing difluoromethane (R32) solely is preferred.

<Natural Refrigerant>

Examples of the natural refrigerant include carbon dioxide (carbonic acid gas) and a hydrocarbon, such as propane, n-butane, isobutane, 2-methylbutane, n-pentane, cyclopentane, isobutane, normal butane, etc. Such a natural refrigerant may be used solely, or may be used in combination of two or more kinds thereof and it may be combined with other refrigerant other than the natural refrigerant. Here, examples of the case of using the natural refrigerant in combination with other refrigerant than the natural refrigerant include a mixed refrigerant in which the natural refrigerant is mixed with the saturated fluorinated hydrocarbon compound and/or the unsaturated fluorinated hydrocarbon compound.

[Refrigerator]

The lubricating oil composition for a refrigerator according to the present embodiment is used by filling in the interior of a refrigerator along with a refrigerant. The refrigerator as referred to herein has a refrigeration cycle constituted of essential components including a compressor, a condenser, an expansion mechanism (e.g., an expansion valve, etc.), and an evaporator, or including a compressor, a condenser, an expansion mechanism, a dryer, and an evaporator. The lubricating oil composition for a refrigerator is one to be used for lubricating a sliding portion provided in, for example, a compressor, etc.

More specifically, the aforementioned lubricating oil composition for a refrigerator can be used for, for example, various refrigerator systems, hot water systems, and heating systems, such as various car air conditioner, e.g., an open type car air-conditioner and an electric car air-conditioner, a gas heat pump (GHP), an air conditioner, a fridge, an automatic vending machine, a showcase, a hot water supply machine, a floor heater, etc., and among these, is preferably used for a car air-conditioner.

EXAMPLES

The present invention will be described more specifically with reference to examples below, but the present invention is not limited to the examples.

The properties and the evaluation of the lubricating oil compositions for a refrigerator were obtained by the procedures shown below.

(1) Kinetic Viscosity (40° C., 100° C.)

The kinematic viscosity was measured with a glass capillary viscometer according to JIS K2283.

(2) Viscosity Index (VI)

The viscosity index was measured according to JIS K2283.

(3) Weight Average Molecular Weight (Mw), Number Average Molecular Weight (Mn), and Mw/Mn The weight average molecular weight and the number average molecular weight were measured with gel permeation chromatography (GPC). In the GPC, the measurement was performed by using two columns of Shodex KF-402HQ and chloroform as an eluent with an RI detector, the weight average molecular weight (Mw) and the number average molecular weight (Mn) were obtained with the standard polystyrene, and the Mw/Mn was obtained from Mw and Mn.

(4) Volume Resistivity

The volume resistivity was measured at room temperature of 25° C. according to JIS C2101-24 (volume resistivity test). The volume resistivity with the saturated moisture content was also measured similarly.

(5) Sealed Tube Test 4 mL and 1 g respectively of the lubricating oil composition for a refrigerator and a refrigerant (HFO1234yf) were placed in a glass tube, in which a metal catalyst of iron, copper, and aluminum was further placed, followed by sealing the tube, and the tube was retained under condition of a temperature of 175° C. for 30 days. Thereafter, the appearance of the oil, the appearance of the iron catalyst, and the presence of sludge were visually observed, and the acid value was measured.

The acid value in the description herein was measured by the indicator method according to "Lubricating oil neutralization test method" defined in JIS K2501.

(6) Sealed Falex Wear Test

A Falex test machine was used, in which AISIC1137/SAE3135 was used as the pin/block. The pin/block was mounted on the Falex test machine, and 400 g of the lubricating oil composition for a refrigerator was placed in the test container, with HFO1234yf used at 0.3 MPa as a refrigerant. The pin wear amount (mg) was measured at a rotation number of 300 rpm, room temperature (25° C.), and a load set at 1,112 N.

(7) Two-Layer Separation Test 1.5 g and 1.5 g respectively of the lubricating oil composition for a refrigerator and a refrigerant (HFO1234ze) were charged in a two-layer separation temperature measuring tube (capacity: 10 mL), which was retained in a thermostat chamber. The temperature of the thermostat chamber was decreased from room temperature (25° C.) to −20° C. at a rate of 1° C./min, and the two-layer separation temperature was measured. In the table, the specimen that was not separated until −20° C. is shown by "−20>", and the specimen that was separated at room temperature is shown by "separated".

Examples 1 to 17 and Comparative Examples 1 to 4

Base oils were prepared by using the low-viscosity base oil components shown in Table 1 and the high-viscosity PAGs shown in Table 2 in the blending amounts shown in Table 3. To each of the base oils of Examples and Comparative Examples, an α-olefin oxide having a total carbon number of 16 as an acid scavenger was added in an amount of 1 mass % based on the total amount of the lubricating oil composition for a refrigerator, so as to prepare the lubricating oil compositions for a refrigerator, which were subjected to the sealed tube test.

To each of the base oils of Examples and Comparative Examples, tricresyl phosphate as an extreme pressure agent was added in an amount of 1 mass % based on the total amount of the lubricating oil composition for a refrigerator, so as to prepare the lubricating oil compositions for a refrigerator, which were subjected to the sealed Falex wear test.

The base oils of Examples and Comparative Examples were used as the lubricating oil compositions for a refrigerator, which were subjected to the two-layer separation test.

The properties and the results of the evaluation tests of the base oils of Examples and Comparative Examples are shown Table 3.

TABLE 1

Low-viscosity base oil component

|  | A1 | A2 | A3 | A4 | A5 |
|---|---|---|---|---|---|
| Kind of base oil | PAG1 | PAG2 | PVE1 | PVE2 | POE1 |
| PO/EO ratio | 10/0 | 10/0 | — | — | — |
| Et/iBu ratio | — | — | 10/0 | 5/5 | — |
| 40° C. Kinetic viscosity (mm²/s) | 5.349 | 11.85 | 5.92 | 22.4 | 7.53 |
| 100° C. Kinetic viscosity (mm²/s) | 1.951 | 3.678 | 1.87 | 4.23 | 2.06 |
| Viscosity index (VI) | 186 | 225 | 83 | 85 | 50 |
| Volume resistivity (Ω · m) | $8.5 \times 10^6$ | $3.1 \times 10^7$ | $9.0 \times 10^{11}$ | $3.8 \times 10^{12}$ | $9.5 \times 10^{11}$ |
| Number average molecular weight (Mn) | 300 | 500 | 350 | 510 | 356 |
| Molecular weight distribution | 1.1 | 1.1 | 1.1 | 1.1 | 1 |

The low-viscosity base oil components in Table 1 are as follows.

PAG1 and PAG2: polyoxypropylene glycol dimethyl ether

PVE1: polyethyl vinyl ether (the both ends thereof are represented by the general formula (A-1-i) and the general formula (A-1-ii) respectively, in which $R^{6a}$ to $R^{8a}$ and $R^{11a}$ to $R^{13a}$ are hydrogen atoms, r1 and r2 are 0, and $R^{10a}$ and $R^{15a}$ are ethyl groups)

PVE2: copolymer of ethyl vinyl ether and isobutyl vinyl ether (molar ratio: 5/5) (the both ends thereof are represented by the general formula (A-1-i) and the general formula (A-1-ii) respectively, in which $R^{6a}$ to $R^{8a}$ and $R^{11a}$ to $R^{13a}$ are hydrogen atoms, r1 and r2 are 0, and $R^{10a}$ and $R^{15a}$ each are an ethyl group or an isobutyl group)

POE1: diester of neopentyl glycol and 2-ethylhexanoic acid

TABLE 2

High-viscosity PAG

|  | B1 | B2 | B3 | B4 | B5 | B6 |
|---|---|---|---|---|---|---|
| Kind | PAG3 | PAG4 | PAG5 | PAG6 | PAG7 | PAG8 |
| PO/EO ratio | 10/0 | 10/0 | 10/0 | 10/0 | 10/0 | 8/2 |
| 40° C. Kinetic viscosity (mm²/s) | 1235 | 8559 | 12820 | 29800 | 46200 | 28200 |
| 100° C. Kinetic viscosity (mm²/s) | 200 | 1154 | 1684 | 4120 | 7960 | 4050 |
| Viscosity index (VI) | 292 | 374 | 395 | 457 | 526 | 461 |
| Volume resistivity (Ω · m) | $7.5 \times 10^7$ | $7.9 \times 10^7$ | $7.8 \times 10^7$ | $7.8 \times 10^7$ | $7.8 \times 10^7$ | $7.6 \times 10^7$ |
| Number average molecular weight (Mn) | 5400 | 18000 | 20000 | 50000 | 100000 | 50000 |
| Molecular weight distribution | 1.1 | 1.1 | 1.2 | 1.3 | 1.4 | 1.3 |

The high-viscosity PAGs in Table 2 are as follows.

PAG3 to PAG7: polyoxypropylene glycol (both ends are hydroxyl groups)

PAG8: polyoxyethylene polyoxypropylene glycol (molar ratio: 2/8, both ends are hydroxyl groups)

TABLE 3

| | | | Example | | | | | |
|---|---|---|---|---|---|---|---|---|
| | | | 1 | 2 | 3 | 4 | 5 | 6 |
| Base oil (wt %) | Low-viscosity base oil component | A1 | 50 | 50 | 50 | 50 | 50 | 50 |
| | | A2 | | | | | | |
| | | A3 | | | | | | |
| | | A4 | | | | | | |
| | | A5 | | | | | | |
| | High-viscosity PAG | B1 | 50 | | | | | |
| | | B2 | | 50 | | | | |
| | | B3 | | | 50 | | | |
| | | B4 | | | | 50 | | |
| | | B5 | | | | | 50 | |
| | | B6 | | | | | | 50 |
| Base oil | 40° C. Kinetic viscosity | mm²/s | 35.4 | 55.96 | 61.24 | 73.46 | 80.49 | 72.6 |
| | 100° C. Kinetic viscosity | mm²/s | 9.014 | 13.06 | 14.5 | 16.57 | 18.58 | 16.56 |
| | Viscosity index | | 251 | 242 | 249 | 243 | 253 | 246 |
| | Volume resistivity | Ω · m | $4 \times 10^7$ | $4 \times 10^7$ | $4 \times 10^7$ | $4 \times 10^7$ | $4 \times 10^7$ | $4 \times 10^7$ |
| | Volume resistivity (with saturated moisture content) | Ω · m | $3 \times 10^6$ | $3 \times 10^6$ | $3 \times 10^6$ | $3 \times 10^6$ | $3 \times 10^6$ | $3 \times 10^6$ |
| | Molecular weight distribution | Mw/Mn | 1.8 | 1.9 | 1.9 | 2.0 | 2.0 | 2.0 |

TABLE 3-continued

| Evaluation results | R1234yf sealed tube test | Appearance of oil | good | good | good | good | good | good |
|---|---|---|---|---|---|---|---|---|
| | | Appearance of catalyst | good | good | good | good | good | good |
| | | Presence of sludge | none | none | none | none | none | none |
| | | Acid value | 0.01 | 0.01 | 0.01 | 0.01 | 0.01 | 0.01 |
| | R1234yf Falex wear test | mg | 1.5 | 1.2 | 1.2 | 1.1 | 1 | 1.1 |
| | R1234ze two-layer separation temperature | °C. | −20> | −20> | −20> | −20> | −20> | −20> |

| | | | Example | | | | |
|---|---|---|---|---|---|---|---|
| | | | 7 | 8 | 9 | 10 | 11 |
| Base oil (wt %) | Low-viscosity base oil component | A1 | 70 | 80 | 90 | 90 | |
| | | A2 | | | | | 90 |
| | | A3 | | | | | |
| | | A4 | | | | | |
| | | A5 | | | | | |
| | High-viscosity PAG | B1 | 30 | | | | |
| | | B2 | | 20 | | | |
| | | B3 | | | 10 | | 10 |
| | | B4 | | | | 10 | |
| | | B5 | | | | | |
| | | B6 | | | | | |
| Base oil | 40° C. Kinetic viscosity | mm²/s | 14.46 | 11.32 | 7.671 | 7.825 | 17.23 |
| | 100° C. Kinetic viscosity | mm²/s | 4.355 | 3.556 | 2.602 | 2.647 | 4.972 |
| | Viscosity index | | 240 | 225 | 204 | 206 | 244 |
| | Volume resistivity | Ω·m | $3 \times 10^7$ | $2 \times 10^7$ | $2 \times 10^7$ | $2 \times 10^7$ | $4 \times 10^7$ |
| | Volume resistivity (with saturated moisture content) | Ω·m | $2 \times 10^6$ | $4 \times 10^6$ | $5 \times 10^6$ | $5 \times 10^6$ | $8 \times 10^6$ |
| | Molecular weight distribution | Mw/Mn | 2.6 | 4.4 | 7.8 | 9.0 | 6.7 |
| Evaluation results | R1234yf sealed tube test | Appearance of oil | good | good | good | good | good |
| | | Appearance of catalyst | good | good | good | good | good |
| | | Presence of sludge | none | none | none | none | none |
| | | Acid value | 0.01 | 0.01 | 0.01 | 0.01 | 0.01 |
| | R1234yf Falex wear test | mg | 2.3 | 2.6 | 3.2 | 3.2 | 2.2 |
| | R1234ze two-layer separation temperature | °C. | −20> | −20> | −20> | −20> | −20> |

| | | | Example | | | | | |
|---|---|---|---|---|---|---|---|---|
| | | | 12 | 13 | 14 | 15 | 16 | 17 |
| Base oil (wt %) | Low-viscosity base oil component | A1 | | | | 40 | 40 | 93 |
| | | A2 | | | | | | |
| | | A3 | 90 | | | | | |
| | | A4 | | 90 | | | | |
| | | A5 | | | 90 | | | |
| | High-viscosity PAG | B1 | | | | 60 | | |
| | | B2 | | | | | 60 | |
| | | B3 | 10 | 10 | 10 | | | |
| | | B4 | | | | | | |
| | | B5 | | | | | | 7 |
| | | B6 | | | | | | |
| Base oil | 40° C. Kinetic viscosity | mm²/s | 8.51 | 32.61 | 10.88 | 60.46 | 114.3 | 6.988 |
| | 100° C. Kinetic viscosity | mm²/s | 2.491 | 5.728 | 2.751 | 14.08 | 23.73 | 2.423 |
| | Viscosity index | | 122 | 117 | 89 | 244 | 240 | 201 |
| | Volume resistivity | Ω·m | $8 \times 10^{11}$ | $3 \times 10^{12}$ | $9 \times 10^{11}$ | $5 \times 10^7$ | $5 \times 10^7$ | $2 \times 10^7$ |
| | Volume resistivity (with saturated moisture content) | Ω·m | $1 \times 10^{11}$ | $7 \times 10^{11}$ | $2 \times 10^{11}$ | $3 \times 10^6$ | $3 \times 10^6$ | $5 \times 10^6$ |
| | Molecular weight distribution | Mw/Mn | 7.5 | 9.2 | 7.5 | 1.6 | 1.6 | 13.0 |
| Evaluation results | R1234yf sealed tube test | Appearance of oil | good | good | good | good | good | good |
| | | Appearance of catalyst | good | good | good | good | good | good |
| | | Presence of sludge | none | none | none | none | none | none |
| | | Acid value | 0.01 | 0.01 | 0.01 | 0.01 | 0.01 | 0.01 |
| | R1234yf Falex wear test | mg | 3.3 | 2.3 | 3.2 | 1.1 | 0.8 | 4.2 |
| | R1234ze two-layer separation temperature | °C. | −20> | −20> | −20> | −20> | −10 | −20> |

| | | | Comparative Example | | | |
|---|---|---|---|---|---|---|
| | | | 1 | 2 | 3 | 4 |
| Base oil (wt %) | Low-viscosity base oil component | A1 | 95 | 99 | 20 | 20 |
| | | A2 | | | | |
| | | A3 | | | | |
| | | A4 | | | | |
| | | A5 | | | | |

TABLE 3-continued

| | | | | | | | |
|---|---|---|---|---|---|---|---|
| | High-viscosity PAG | B1 | | | | 80 | |
| | | B2 | | | | | 80 |
| | | B3 | | | | | |
| | | B4 | | | | | |
| | | B5 | | 5 | | | |
| | | B6 | | | 1 | | |
| Base oil | 40° C. Kinetic viscosity | mm²/s | 6.457 | 5.543 | 223.3 | 701.8 |
| | 100° C. Kinetic viscosity | mm²/s | 2.273 | 2.008 | 43.06 | 114.5 |
| | Viscosity index | | 198 | 189 | 249 | 264 |
| | Volume resistivity | Ω·m | $1 \times 10^7$ | $9 \times 10^6$ | $6 \times 10^7$ | $6 \times 10^7$ |
| | Volume resistivity (with saturated moisture content) | Ω·m | $6 \times 10^6$ | $7 \times 10^6$ | $9 \times 10^6$ | $9 \times 10^6$ |
| | Molecular weight distribution | Mw/Mn | 17.9 | 39.5 | 1.2 | 1.2 |
| Evaluation results | R1234yf sealed tube test | Appearance of oil | good | good | good | good |
| | | Appearance of catalyst | good | good | good | good |
| | | Presence of sludge | none | none | none | none |
| | | Acid value | 0.01 | 0.01 | 0.01 | 0.01 |
| | R1234yf Falex wear lest | mg | 9.3 | 15.8 | 0.7 | 0.6 |
| | R1234ze two-layer separation temperature | ° C. | −20> | −20> | separated | separated |

In the lubricating oil compositions for a refrigerator of Examples, the high-viscosity PAG is added to make the kinetic viscosity at 100° C. and the Mw/Mn of the base oil within the prescribed ranges, whereby the 40° C. kinetic viscosity becomes relatively low, and in the application to a refrigerator, the power loss in low-temperature start-up and low-temperature operation can be suppressed to enable energy saving. The lubricating oil compositions for a refrigerator of Examples have good lubricating performance as shown by the results of the wear test, and have good compatibility with an HFO1234ze refrigerant and thus can be favorably used with an HFO refrigerant as shown by the results of the two-layer separation test. In Examples, furthermore, good results are obtained in the sealed tube test, a large volume resistivity is obtained, and the electric insulating property and the thermal stability are good.

In the lubricating oil compositions for a refrigerator of Comparative Examples 1 and 2, on the other hand, the kinetic viscosity at 100° C. of the base oil is too low, and the Mw/Mn thereof is too large, whereby the lubricating performance is insufficient as shown by the results of the wear test. In Comparative Examples 3 and 4, the kinetic viscosity at 100° C. of the base oil is too high, and the Mw/Mn thereof is too small, whereby the 40° C. kinetic viscosity becomes too high, from which it is understood that the power loss in low-temperature start-up and low-temperature operation cannot be sufficiently suppressed to fail to achieve energy saving sufficiently. Furthermore, the lubricating oil compositions for a refrigerator are insufficient in compatibility with an HFO1234ze refrigerant and thus is not preferred to use with an HFO refrigerant.

The invention claimed is:

1. A lubricating oil composition, comprising:
    a base oil comprising
        a low-viscosity base oil component, which is a polymer having a kinetic viscosity at 100° C. from 0.5 to 5 mm²/s;
        a polyoxyalkylene glycol compound having a number average molecular weight (Mn) from 15,000 to 1,000,000 and a kinetic viscosity at 100° C. from 600 to 50,000 mm²/s,
    wherein the base oil has a kinetic viscosity at 100° C. from 2.4 to 25 mm²/s and a ratio (Mw/Mn) of a weight average molecular weight (Mw) and a number average molecular weight (Mn) in a range of 1.3 to 13.

2. The lubricating oil composition according to claim 1, wherein the low-viscosity base oil component has a number average molecular weight (Mn) of 100 to 1,500.

3. The lubricating oil composition according to claim 1, wherein the low-viscosity base oil component is at least one selected from the group consisting of a polyoxyalkylene glycol compound, a polyvinyl ether compound, and a copolymer of a poly(oxy)alkylene glycol or a monoether thereof and a polyvinyl ether.

4. The lubricating oil composition according to claim 1, wherein the polyoxyalkylene glycol compound has a kinetic viscosity at 100° C. from 1,600 to 50,000 mm²/s, an Mw/Mn ratio in a range of 1 to 5, and a viscosity index (VI) of 280 or more.

5. The lubricating oil composition according to claim 1, wherein the polyoxyalkylene glycol compound is present in an amount of 7 mass % or more based on the total amount of the base oil.

6. The lubricating oil composition according to claim 1, further comprising:
    at least one additive selected from the group consisting of an antioxidant, an acid scavenger, an oxygen scavenger, an extreme pressure agent, an oiliness agent, a copper deactivator, a rust preventive, and an anti-foaming agent.

7. The lubricating oil composition according to claim 1, which is suitable for use with at least one refrigerant selected from the group consisting of an unsaturated fluorinated hydrocarbon compound, a saturated fluorinated hydrocarbon compound, carbon dioxide, and a hydrocarbon.

8. A refrigerator comprising, charged therein, the lubricating oil composition according to claim 1, and a refrigerant.

9. A method for producing a lubricating oil composition comprising a base oil, the method comprising:
    adding a polyoxyalkylene glycol compound having a number average molecular weight (Mn) from 15,000 to 1,000,000 and a kinetic viscosity at 100° C. from 600 to 50,000 mm²/s to a low-viscosity base oil component, which is a polymer having a kinetic viscosity at 100° C. from 0.5 to 5 mm²/s, to obtain the base oil,
    wherein the base oil has a kinetic viscosity at 100° C. from 2.4 to 25 mm²/s and a ratio (Mw/Mn) of a weight average molecular weight (Mw) and a number average molecular weight (Mn) in a range of 1.3 to 13.

10. The lubricating oil composition according to claim 1, wherein the polyoxyalkylene glycol compound has a viscosity index of 374 or more.

11. The method according to claim 9, wherein the polyoxyalkylene glycol compound has a viscosity index of 374 or more.

\* \* \* \* \*